US012693375B2

(12) United States Patent
Aoki et al.

(10) Patent No.: US 12,693,375 B2
(45) Date of Patent: Jul. 28, 2026

(54) ANTENNA APPARATUS AND RADAR APPARATUS

(71) Applicant: DENSO CORPORATION, Kariya-city (JP)

(72) Inventors: Kazuhiro Aoki, Kariya-city (JP); Yusuke Tainaka, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 457 days.

(21) Appl. No.: 18/299,992

(22) Filed: Apr. 13, 2023

(65) Prior Publication Data

US 2023/0243920 A1     Aug. 3, 2023

Related U.S. Application Data

(63) Continuation of application No. PCT/JP2021/038510, filed on Oct. 19, 2021.

(30) Foreign Application Priority Data

Oct. 19, 2020     (JP) ................................. 2020-175397

(51) Int. Cl.
*G01S 7/03* (2006.01)
*H01Q 9/04* (2006.01)

(52) U.S. Cl.
CPC ................ *G01S 7/032* (2013.01); *G01S 7/03* (2013.01); *H01Q 9/045* (2013.01)

(58) Field of Classification Search
CPC ........ G01S 7/032; G01S 7/027; G01S 13/931;

G01S 7/03; H01Q 9/045; H01Q 1/3233; H01Q 13/18; H01Q 21/08; H01P 5/107; H01P 3/12; H01P 5/08
See application file for complete search history.

(56) References Cited

U.S. PATENT DOCUMENTS

| | | | |
|---|---|---|---|
| 7,639,183 B2 * | 12/2009 | Teshirogi | ............... H01Q 13/06 |
| | | | 343/895 |
| 9,431,709 B2 * | 8/2016 | McKinzie, III | ...... H01Q 15/008 |
| 2018/0284216 A1 | 10/2018 | Aoki | |

(Continued)

FOREIGN PATENT DOCUMENTS

| | | | | |
|---|---|---|---|---|
| WO | WO-0021159 A2 * | 4/2000 | ............... | G01S 7/03 |
| WO | WO-2019189622 A1 * | 10/2019 | ............... | H01P 3/088 |

*Primary Examiner* — Vladimir Magloire
*Assistant Examiner* — Anna K. Gosling
(74) *Attorney, Agent, or Firm* — Precision Patents, P.C.

(57) ABSTRACT

An antenna apparatus includes a conductor layer A, a conductor layer B, and a dielectric layer that is sandwiched between the conductor layer A and the conductor layer B. In the conductor layer A, a first antenna, a second antenna, and a connection conductor are formed. The connection conductor is connected to both of the first antenna and the second antenna. In the dielectric layer, a guard conductor is provided. The guard conductor is arranged along an outer periphery of the connection conductor that excludes at least a first connection section and a second connection section of the connection conductor. The first connection section is a connection section of the connection conductor that is connected to the first antenna. The second connection section is a connection section of the connection conductor that is connected to the second antenna.

16 Claims, 6 Drawing Sheets

(56)                     References Cited

U.S. PATENT DOCUMENTS

| 2018/0287742 | A1 | 10/2018 | Feng |
|---|---|---|---|
| 2020/0328850 | A1 | 10/2020 | Feng |
| 2021/0013573 | A1 | 1/2021 | Aoki |

* cited by examiner

ANTENNA APPARATUS AND RADAR APPARATUS

CROSS-REFERENCE TO RELATED APPLICATION

The present application is a continuation application of International Application No. PCT/JP2021/038510, filed on Oct. 19, 2021, which claims priority to Japanese Patent Application No. 2020-175397, filed on Oct. 19, 2020. The contents of these applications are incorporated herein by reference in their entirety.

BACKGROUND

Technical Field

The present disclosure relates to an antenna apparatus and a radar apparatus.

Background Art

An antenna apparatus in which a pair of microstrip antennas are connected is known.

SUMMARY

An aspect of the present disclosure provides an antenna apparatus that includes a conductor layer A, a conductor layer B, and a dielectric layer that is sandwiched between the conductor layer A and the conductor layer B. A first antenna, a second antenna, and a connection conductor are formed in the conductor layer A. The connection conductor is connected to both of the first antenna and the second antenna. A guard conductor is provided in the dielectric layer. The guard conductor is arranged along an outer periphery of the connection conductor that excludes at least a first connection section and a second connection section of the connection conductor. The first connection section is a connection section of the connection conductor that is connected to the first antenna. The second connection section is a connection section of the connection conductor that is connected to the second antenna.

BRIEF DESCRIPTION OF THE DRAWINGS

In the accompanying drawings:

FIG. 5 is a diagram illustrating a member that is connected to a first-side converting unit according to the embodiment;

FIG. 7 is a perspective view of vias that are connected to the eighth-side converting unit and the antenna connecting portion according to the embodiment, illustrating an arrangement of the vias.

DESCRIPTION OF THE EMBODIMENTS

For example, JP 6365494 B2 describes an antenna apparatus in which a pair of microstrip antennas are connected. When the pair of microstrip antennas are connected as described above, directivity of the antennas may shift from that which is intended due to unwanted radiation from a connection section.

To solve the above-described issue, an exemplary embodiment provides an antenna apparatus that includes a conductor layer A, a conductor layer B, and a dielectric layer that is sandwiched between the conductor layer A and the conductor layer B. A first antenna, a second antenna, and a connection conductor are formed in the conductor layer A. The connection conductor is connected to both of the first antenna and the second antenna. A guard conductor (48) is provided in the dielectric layer. The guard conductor is arranged along an outer periphery of the connection conductor that excludes at least a first connection section and a second connection section of the connection conductor. The first connection section is a connection section of the connection conductor that is connected to the first antenna. The second connection section is a connection section of the connection conductor that is connected to the second antenna.

According to the above-described configuration, an in-substrate waveguide that propagates signals between an antenna connecting portion, and the first antenna and the second antenna can be configured by the conductor layer A, the conductor layer B, and the guard conductor. Consequently, unwanted radiation can be suppressed from being radiated from the antenna connecting portion.

An embodiment of a radar apparatus will hereinafter be described with reference to the drawings.

Figure 1:
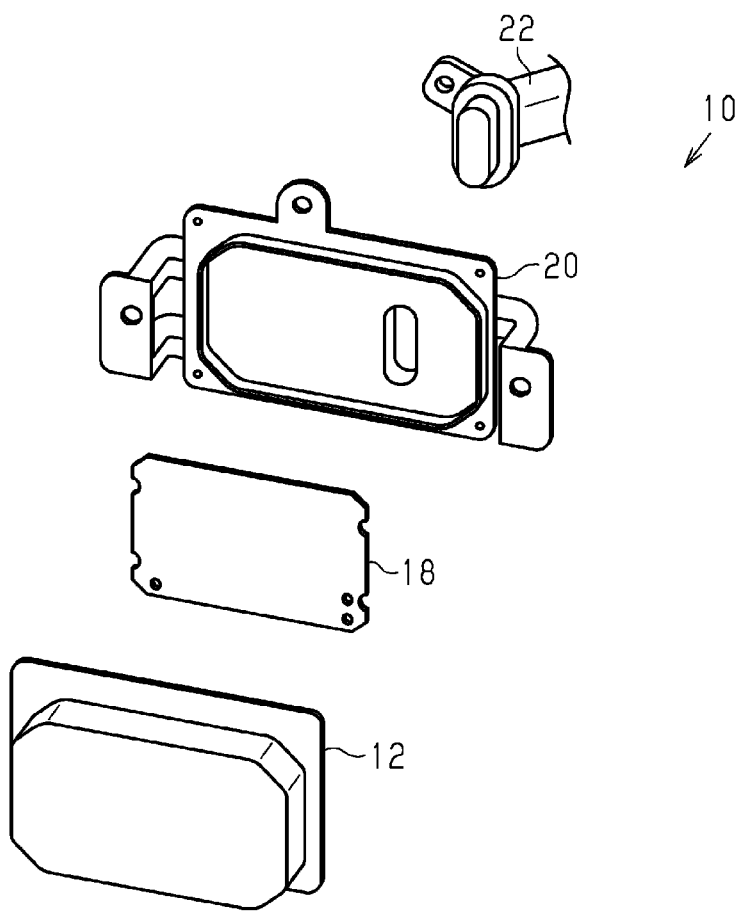
FIG. 1 is an exploded perspective view of a radar apparatus according to an embodiment, illustrating a configuration of the radar apparatus.

FIG. 1 shows a configuration of a radar apparatus 10 according to the present embodiment. The radar apparatus 10 is an apparatus in which an antenna apparatus 18 is housed in a space that is demarcated by a radome 12 and a lower case 20, and a connector 22 is attached to the lower case 20.

Figure 2:
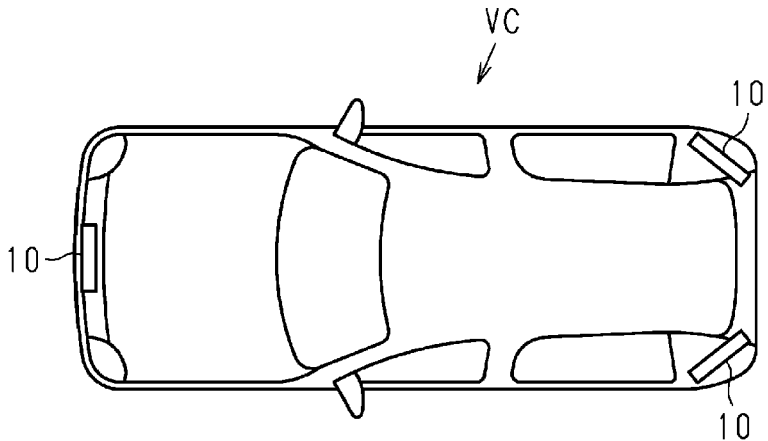
FIG. 2 is a diagram illustrating an example of an arrangement of the radar apparatus according to the embodiment.

FIG. 2 shows an example of an arrangement of the radar apparatus 10. FIG. 2 shows an example in which one radar apparatus 10 is arranged in a front center portion of a vehicle VC, and one radar apparatus 10 each is arranged on rear left and right portions.

Figure 3:
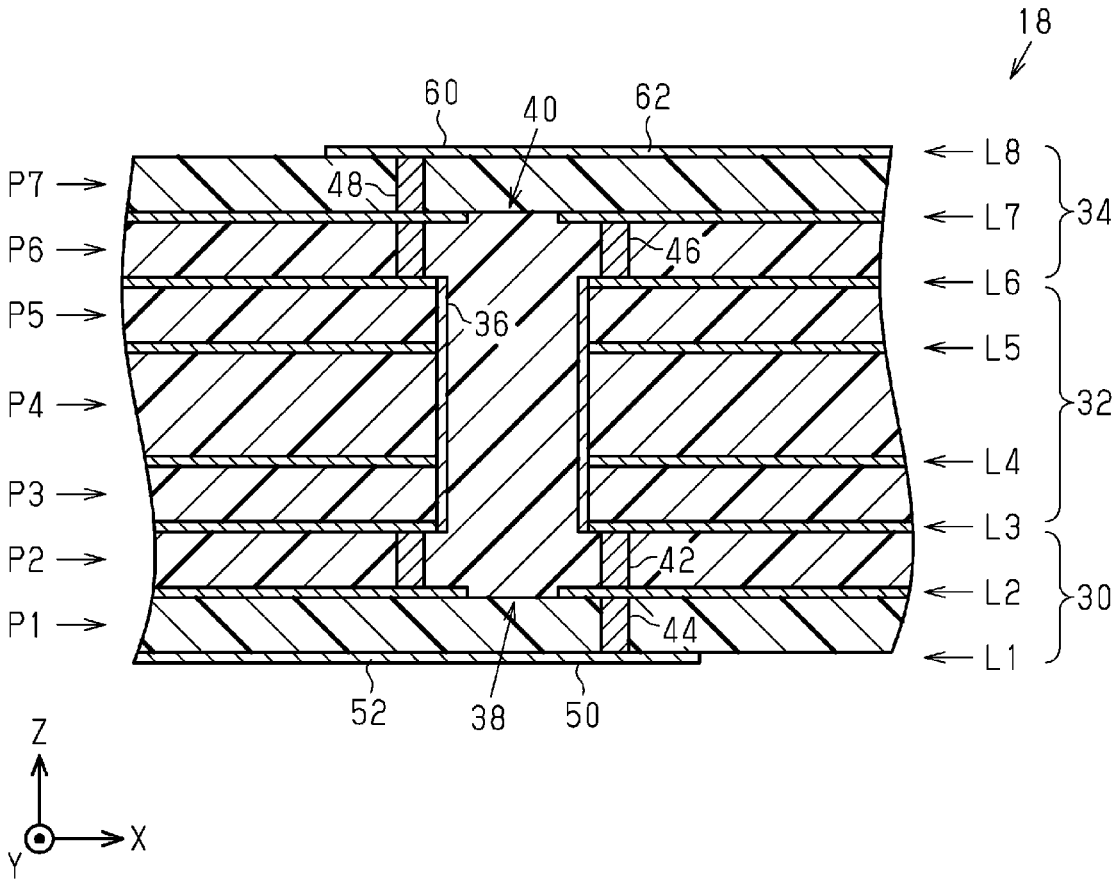
FIG. 3 is a cross-sectional view of an antenna apparatus according to the embodiment, illustrating a cross-sectional configuration of the antenna apparatus.

FIG. 3 shows a cross-sectional configuration of the antenna apparatus 18. The antenna apparatus 18 is a substrate in which a first conductor layer (conductor layer C) L1, a first dielectric layer P1, a second conductor layer L2, a second dielectric layer P2, a third conductor layer L3, a third dielectric layer P3, a fourth conductor layer L4, a fourth dielectric layer P4, a fifth conductor layer L5, a fifth dielectric layer P5, a sixth conductor layer L6, a sixth dielectric layer P6, a seventh conductor layer (conductor layer B) L7, a seventh dielectric layer P7, and an eighth conductor layer (conductor layer A) L8 are successively laminated. Here, as shown in FIG. 3, hereafter, a lamination direction is a z direction. In particular, a direction from the first conductor layer L1 towards the eighth conductor layer L8 is a positive z direction.

Hereafter, for convenience, the antenna apparatus 18 is divided into a first outer layer portion 30, an inner layer portion 32, and a second outer layer portion 30. The first outer layer portion 30 includes the first conductor layer L1, the first dielectric layer P1, the second conductor layer L2, and the second dielectric layer P2. The inner layer portion 32 includes the third conductor layer L3, the third dielectric layer P3, the fourth conductor layer L4, the fourth dielectric layer P4, the fifth conductor layer L5, the fifth dielectric layer P5, and the sixth conductor layer L6. The second outer layer portion 34 includes the sixth dielectric layer P6, the seventh conductor layer L7, the seventh dielectric layer P7, and the eighth conductor layer L8.

A waveguide 36 is provided in the inner layer portion 32 so as to pass through the inner layer portion 32. In addition, the third conductor layer L3, the fourth conductor layer L4, the fifth conductor layer L5, and the sixth conductor layer L6 that configure the inner layer portion 32 are all grounded and configure a ground plane.

Figure 4:
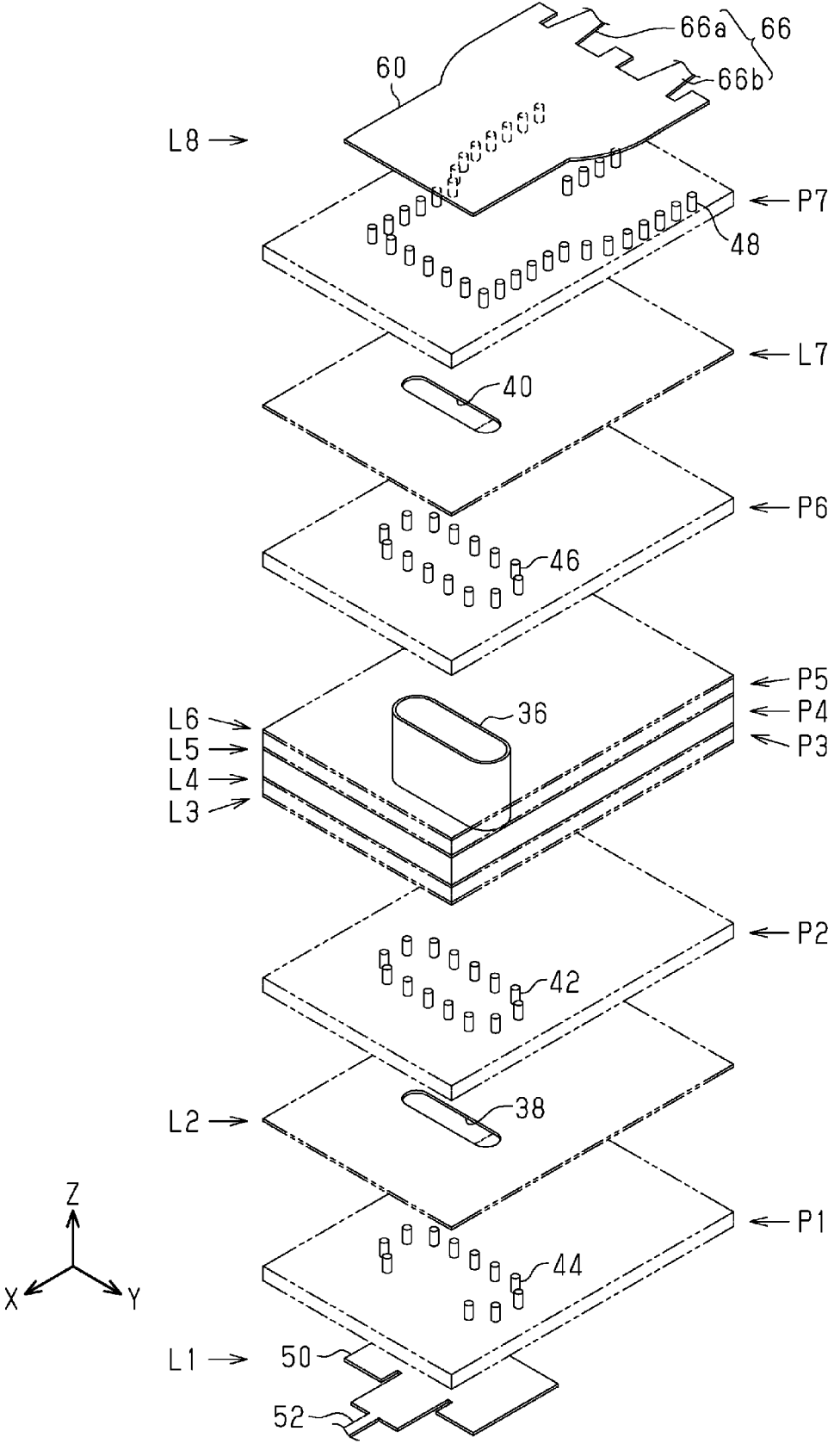
FIG. 4 is an exploded perspective view of the antenna apparatus according to the embodiment, illustrating of a configuration of the antenna apparatus.

FIG. 4 shows an exploded perspective view of the antenna apparatus 18.

As shown in FIG. 4, a microstrip line 52 and a first-side converting unit 50 that converts signals transmitted from either of the waveguide 36 and the microstrip line 52 to the other are formed in the first conductor layer L1.

Figure 5:
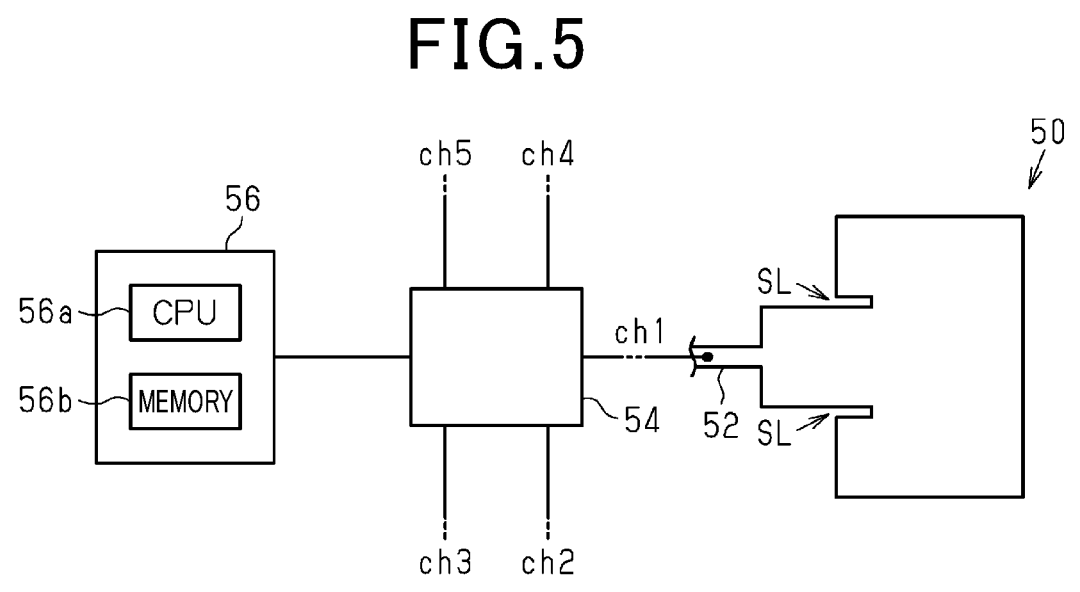

As shown in FIG. 5, a monolithic microwave integrated circuit (MMIC) 54 is connected to the first-side converting unit 50 with the microstrip line 52 therebetween.

The MMIC 54 according to the present embodiment includes terminals of two channels for transmission and terminals of three channels for reception. Therefore, in actuality, in the first conductor layer L1, a separate first-side converting unit 50 is formed for each of these channels. Here, the first-side converting unit 50 for transmission is a member for converting a high frequency signal from the MMIC 54 to an electromagnetic wave and outputting the electromagnetic wave to the waveguide 36. In addition, the first-side converting unit 50 for reception is a member that converts an electromagnetic wave from the waveguide 36 to a high frequency signal that is outputted to the microstrip line 52.

The MMIC 54 performs a transmission process in which a high frequency signal of 76 to 77 GHz is generated and transmitted to the microstrip line 52, and a reception process in which a high frequency signal of 76 to 77 GHz that is inputted through the microstrip line 52 is received. In addition, the MMIC 54 includes a mixer that combines the high frequency signal that is transmitted in the transmission process and the high frequency signal that is received in the reception process, and the like.

The waveguide 36 is composed of metal and has a tubular structure. A pair of end portions in the z direction that is an axial direction of the waveguide 36 is respectively connected to the third conductor layer L3 and the sixth conductor layer L6.

According to the present embodiment, a signal to be transmitted by the waveguide 36 is a signal in a single base mode among transverse electric (TE) modes. A reason for this is that, compared to a case in which signals in a plurality of modes are to be transmitted, signal processing is facilitated and the like. Specifically, as the waveguide 36, a waveguide that corresponds to a rectangular waveguide is used. In this waveguide, a signal in the base mode, which is a single mode among the TE modes, is one for which, among cutoff frequencies of the modes, the cutoff frequency is less than a frequency band of 76 to 77 GHz. The waveguide 36 according to the present embodiment corresponds to a rectangular waveguide. The TE modes are assumed to be prescribed such that a boundary condition that electric fields are zero on both ends in a long direction is met.

The MMIC 54 is connected to a microcomputer 56. The microcomputer 56 includes a central processing unit (CPU) 56a and a memory 56b. The CPU 56a runs a program that is stored in the memory 56b. The MMIC 54 and the microcomputer 56 correspond to a processing circuit. Here, processes performed by the CPU 56a include a process to control the transmission process and the reception process for high frequency signals performed by the MMIC 54. In addition, the processes performed by the CPU 56a include a process in which a relative distance and a relative speed between an object and the radar apparatus 10 are calculated based on the signals combined by the above-described mixer, the object being that which reflects the high frequency signal transmitted from the radar apparatus 10, and a process in which a calculation result is transmitted outside the radar apparatus 10 through the connector 22.

Returning to FIG. 4, an antenna 66 and an eighth-side converting unit 60 that converts a signal that is transmitted from either of the antenna 66 and the waveguide 36 to the other are formed in the eighth conductor layer L8.

As shown in FIG. 3 and FIG. 4, a second-side slit 38 is formed in the second conductor layer L2. In addition, a via 42 is provided on the second dielectric layer P2. Specifically, a figure in which the via 42 is perpendicularly projected onto a plane that includes the second conductor layer L2 and is orthogonal to the z direction is a figure that surrounds the second-side slit 38. Here, each of a plurality of vias 42 extends in the z direction, and thereby connects the second conductor layer L2 and the third conductor layer L3. As a result, the second conductor layer L2 is also grounded and a ground plane is configured.

Furthermore, a via 44 is formed on the first dielectric layer P1. Specifically, a figure in which the via 44 is perpendicularly projected onto a plane that includes the first conductor layer L1 and is orthogonal to the z direction is formed along an outer periphery of the first-side converting unit 50, excluding a vicinity of a connection section to the microstrip line 52. In addition, a figure in which the via 44 is perpendicularly projected onto a plane that includes the first conductor layer L1 and is orthogonal to the z direction is a figure that surrounds a figure in which the second-side slit 38 is perpendicularly projected onto the same plane, excluding the vicinity of the above-described connection section. This is to reduce transmission loss of signals between the microstrip line 52 and the first-side converting unit 50. Here, each of a plurality of vias 44 extends in the z direction, and thereby connects the second conductor layer L2 and the first conductor layer L1.

A seventh-side slit 40 is formed in the seventh conductor layer L7. In addition, a via 46 is provided on the sixth dielectric layer P6. Specifically, a figure in which the via 46 is perpendicularly projected onto a plane that includes the seventh conductor layer L7 and is orthogonal to z direction is a figure that surrounds the seventh-side slit 40. Here, each of a plurality of vias 46 extends in the z direction, and thereby connects the seventh conductor layer L7 and the sixth conductor layer L6. As a result, the seventh conductor layer L7 is also grounded and a ground plane is configured.

Furthermore, a via 48 is provided on the seventh dielectric layer P7. The via 8 extends in the z direction, and thereby connects the seventh conductor layer L7 and the eighth conductor layer L8. The via 48 corresponds to a guard conductor.

Figure 6:
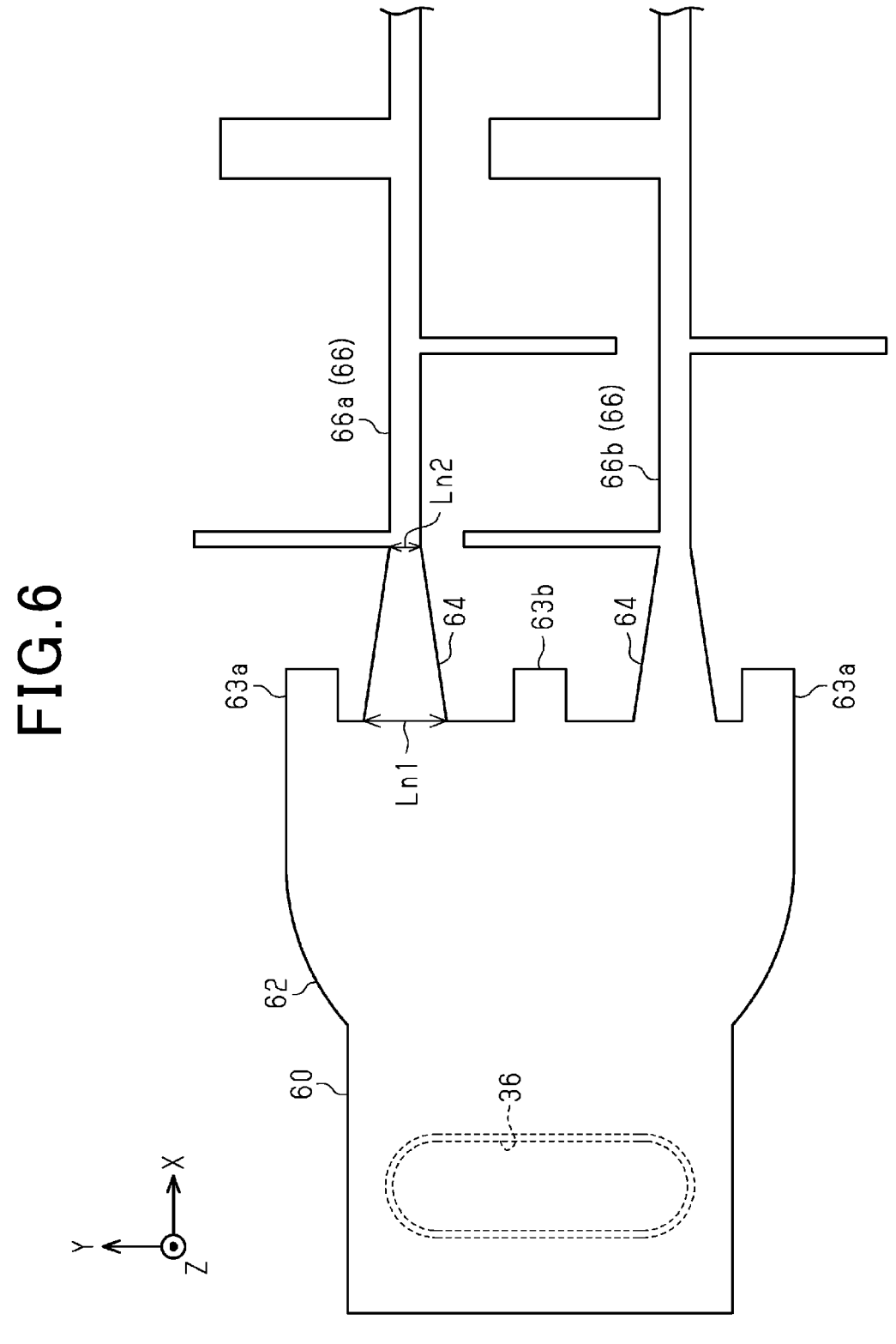
FIG. 6 is a plan view of an eighth-side converting unit, an antenna connecting portion, and an antenna according to the embodiment.

FIG. 6 shows a portion of the eighth conductor layer L8.

A broken line shown in FIG. 6 is a figure in which the waveform 36 is perpendicularly projected onto a plane that includes the eighth conductor layer L8 and is orthogonal in the z direction. As shown in FIG. 6, this figure is encompassed in the eighth-side converting unit 60. Here, this figure substantially overlaps a figure in which the seventh-side slit 40 is perpendicularly projected onto the plane that includes the eighth conductor layer L8 and is orthogonal to the z direction. In addition, this figure is surrounded by the figure in which the vias 46 are perpendicularly projected onto the plane that includes the eighth conductor layer L8 and is orthogonal in the z direction.

An antenna connecting portion 62 of which a length in a y direction gradually increases is connected to the eighth-side converting unit 60. The antenna 66 is connected to the antenna connecting portion 62 with an impedance conversion circuit 64 therebetween. Specifically, a first antenna 66a and a second antenna 66b are respectively connected by a pair of impedance conversion circuits 64. Here, the impedance conversion circuit 64 is such that a length Ln2 in the y direction in a connection section to the antenna 66 is shorter than a length Ln1 in the y direction in a connection section to the antenna connecting portion 62. In addition, the impedance conversion circuit 64 has a shape in which the length in the y direction gradually decreases from the antenna connecting portion 62 towards the antenna 66. This setting is made to suppress sudden changes in impedance on a path from either of the antenna connecting portion 62, and the first antenna 66a and the second antenna 66b to the other. The eighth-side converting unit 60, the antenna connecting portion 62, and the impedance conversion circuit 64 correspond to a connection conductor.

The first antenna 66a and the second antenna 66b are laid along an x direction. In FIG. 6, a direction in which the first antenna 66a and the second antenna 66b extend is a positive x direction.

Of an end portion in the positive x direction of the antenna connecting portion 62, side protruding portions 63a that sandwich the pair of impedance conversion circuits 64 are provided on both ends in the y direction. The side protruding portion 63a is a rectangular conductor that protrudes in the positive x direction in relation to the antenna connecting portion 62.

Of the end portion in the positive x direction of the antenna connecting portion 62, an intermediate protruding portion 63b is provided between connection sections to each of the pair of impedance conversion circuits 64. The intermediate protruding portion 63b is a rectangular conductor that protrudes in the positive x direction in relation to the antenna connecting portion 62.

Figure 7:
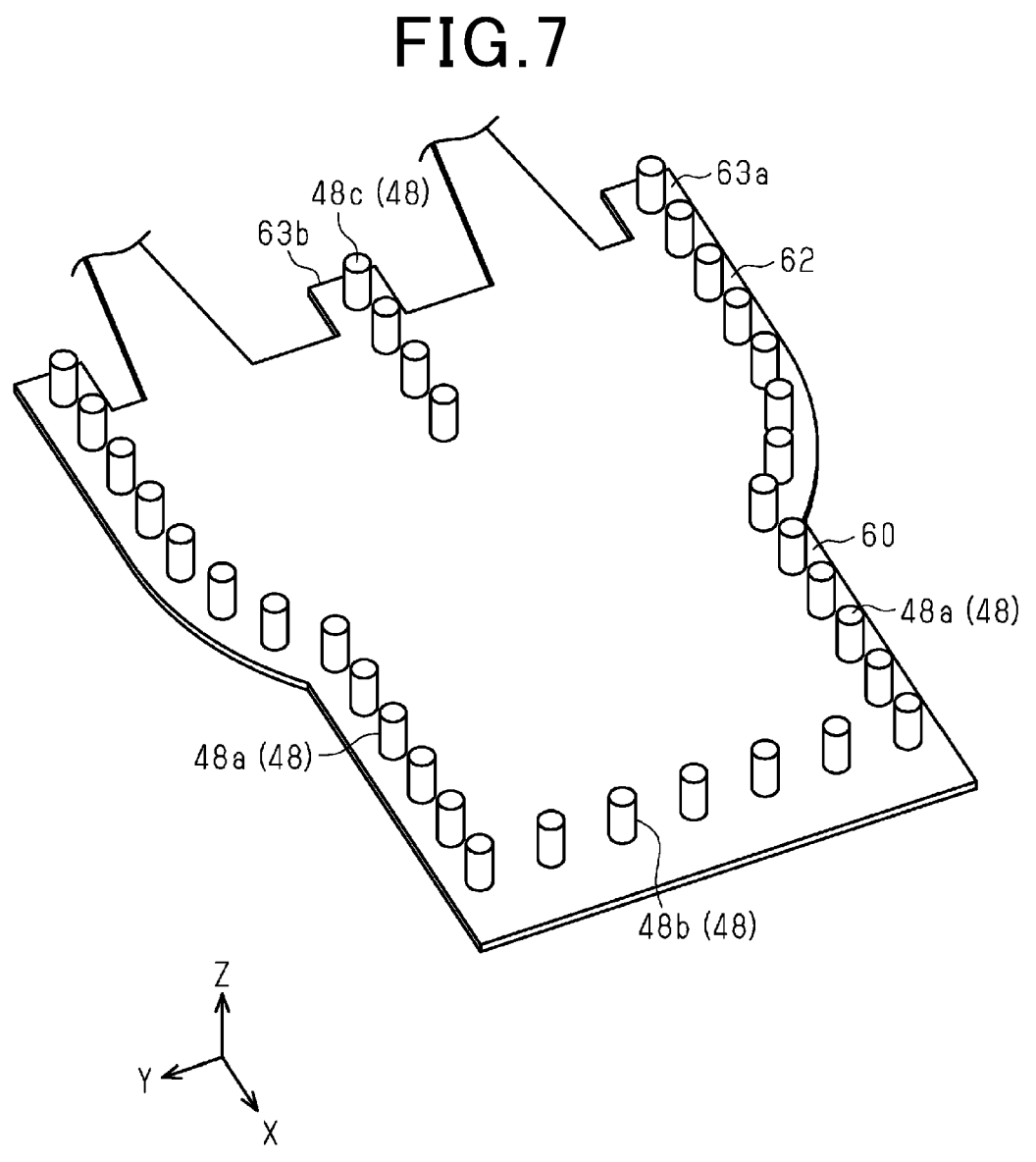

FIG. 7 shows a diagram of the eighth-side converting unit 60, the antenna connecting portion 62, the impedance conversion circuits 64, the side protruding portions 63a, and the intermediate protruding portion 63b, viewed from a negative z direction side.

As shown in FIG. 7, the vias 48 include a plurality of side vias 48a that are formed in a row along an outer periphery of each of both end portions in the y direction of the eighth-side converting unit 60 and the antenna connecting portion 62. In addition, the side vias 48a include the vias 48 that are connected to the side protruding portions 63a. In other words, the side vias 48a include the vias 48 that are arranged in positions along the side protruding portions 63a. Specifically, a figure in which these side vias 48a are perpendicularly projected onto the plane that includes the eighth conductor layer L8 and is orthogonal to the z direction is encompassed in the eighth-side converting unit 60, the antenna connecting portion 62, and the side protruding portions 63a.

The vias 48 have a plurality of backside vias 48b that are formed in a row along an outer periphery on an end portion side in the negative x direction of the eighth-side converting unit 60. Specifically, a figure in which these backside vias 48b are perpendicularly projected onto the plane that includes the eighth conductor layer L8 and is orthogonal to the z direction is encompassed in the eighth-side converting unit 60.

In addition, the vias 48 include a plurality of intermediate vias 48c that are formed in a row along the x direction in a center portion in the y direction of the antenna connecting portion 62. Furthermore, the intermediate vias 48c include the vias 48 that are connected to the intermediate protruding portion 63b. In other words, the intermediate vias 48c include the vias 48 that are arranged in a position along the intermediate protruding portion 63b. Specifically, a figure in which these intermediate vias 48c are perpendicularly projected onto the plane that includes the eighth conductor layer L8 and is orthogonal to the z direction is encompassed in the antenna connecting portion 62 and the intermediate protruding portion 63b.

Here, as a result of a configuration such as this, a figure in which the waveguide 36 is perpendicularly projected onto the plane that includes the eighth conductor layer L8 and is orthogonal to the z direction is a figure that is surrounded by the figure in which the vias 48 are perpendicularly projected onto the same plane, excluding the vicinity of the pair of impedance conversion circuits 64.

Here, workings and effects according to the present embodiment will be described.

The first antenna 66a and the second antenna 66b are connected to the eighth-side converting unit 60 with the antenna connecting portion 62 therebetween. The side vias 48a are connected along the outer periphery on each of the both end portions in the y direction of the antenna connecting portion 62. As a result, an in-substrate waveguide is formed by the seventh conductor layer L7, the eighth conductor layer L8, and the side vias 48a. Consequently, compared to a case in which the side vias 48a are not provided, unwanted radiation can be suppressed from occurring from the antenna connecting portion 62. Furthermore, directivity actualized by the first antenna 66a and the second antenna 66b can be suppressed from becoming distorted from that which is intended.

According to the present embodiment described above, workings and effects described below can further be achieved.

(1) The intermediate vias 48c are connected to the antenna connecting portion 62. As a result, a distributor that distributes signals from the eighth-side converting unit 60 to the first antenna 66a and the second antenna 66b, and a coupler that merges signals from the first antenna 66a and the second antenna 66b to the eighth-side converting unit 60 can be formed in the in-substrate waveguide. Consequently, unwanted radiation can be suppressed from being radiated from the antenna connecting portion 62.

(2) The eighth-side converting unit 60 is connected to the antenna connecting portion 62, and signals that are transmitted and received between the waveguide 36 and the antenna connecting portion 62 are converted by the eighth-side converting unit 60. In this case, a distributor or a coupler that is formed between the eighth-side converting unit 60, and the first antenna 66a and the second antenna 66*b* can be configured by a simple design by the in-substrate waveguide that is configured by the antenna connecting portion 62 and the vias 48. In addition, as a result of the in-substrate waveguide, a signal that is in a same mode as the signal that is propagated through the waveguide 36 can be propagated. Consequently, for example, compared to a case in which signals are transmitted over a coaxial line from the MMIC 54 to the eighth conductor layer L8, signal transfer loss can be easily reduced.

(3) The first antenna 66*a* and the second antenna 66*b* are connected to the antenna connecting portion 62 with the impedance conversion circuits 64 therebetween. Consequently, impedance can be suppressed from suddenly changing in the transmission of signals from either of (i) the antenna connecting portion 62 and (ii) the first antenna 66*a* or the second antenna 66*b* to the other.

(4) The side protruding portions 63*a* that are connected to the seventh conductor layer L7 by the vias 48 are provided. Consequently, unwanted radio waves can be suppressed from being radiated through the impedance conversion circuits 64.

(5) The intermediate protruding portion 63*b* that is connected to the seventh conductor layer L7 by the vias 48 is provided. Consequently, unwanted radio waves can be suppressed from being radiated through the impedance conversion circuits 64.

Other Embodiments

Here, the present embodiment can be modified in a following manner. The present embodiment and modification examples below can be combined as long as technical inconsistencies do not arise.

[Regarding the Side Protruding Portion]

The side protruding portion 63*a* being such that a length extending in the x direction is shorter than a length in the x direction of the impedance conversion circuit 64 is not a requisite. For example, the length in the x direction of the side protruding portion 63*a* may be equal to the length in the x direction of the impedance conversion circuit 64. Alternatively, for example, the length in the x direction of the side protruding portion 63*a* may be longer than the length in the x direction of the impedance conversion circuit 64.

Here, the impedance conversion circuit 64 being provided is not a prerequisite for the side protruding portion 63*a* being provided. That is, even in a case in which the impedance conversion circuit 64 is not provided, the side protruding portions 63*a* being provided so as to sandwich the connection sections of the antenna connecting portion 62, and the first antenna 66*a* and the second antenna 66*b* is effective in terms of suppressing electrical field leakage.

[Regarding the Intermediate Protruding Portion]

The intermediate protruding portion 63*b* being such that a length extending in the x direction is shorter than the length in the x direction of the impedance conversion circuit 64 is not a requisite. For example, the length in the x direction of the intermediate protruding portion 63*b* may be equal to the length in the x direction of the impedance conversion circuit 64. Alternatively, for example, the length in the x direction of the intermediate protruding portion 63*b* may be longer than the length in the x direction of the impedance conversion circuit 64.

Here, the impedance conversion circuit 64 being provided is not a prerequisite for the intermediate protruding portion 63*b* being provided. That is, even in a case in which the impedance conversion circuit 64 is not provided, the intermediate protruding portion 63*b* being provided between the connection sections of the antenna connecting portion 62, and the first antenna 66*a* and the second antenna 66*b* is effective in terms of suppressing electrical field leakage.

[Regarding a Number of Antennas Connected to the Antenna Connecting Portion]

A number of antennas that are connected to the antenna connecting portion 62 is not limited to two antennas that are first antenna 66*a* and second antenna 66*b*, and may be three or more. In addition, individual antennas may have differing shapes and radiation directivities. Here, not all of the plurality of antenna connecting portions 62 that are formed in the antenna apparatus 18 are required to be connected to a plurality of antennas. An antenna connecting portion that is connected to only a single antenna may also be included.

[Regarding the Connection Conductor]

The impedance conversion circuit 64 that gradually changes impedance from a value that is either of a pair of impedances that are an impedance of the antenna connecting portion 62 and an impedance of the first antenna 66*a* or the second antenna 66*b* to a value that is the other of the pair of impedances being provided between the antenna connecting portion 64 and the first antenna 66*a* and the second antenna 66*b* is not a requisite.

The antenna connecting portion 62 being formed by the length in the y direction being increased in relation to the eighth-side converting unit 60 is not a requisite. For example, the lengths in the y direction may be the same between the eighth-side converting unit 60 and the antenna connecting portion 62. At this time, for example, in a case in which the intermediate vias 48*c* are not provided as described in a section [Regarding the guard conductor] or the like, the eighth-side converting unit 60 and the antenna connecting portion 62 being divided is not a requisite. For example, the eighth-side converting unit 60 and the antenna connecting portion 62 may be integrated and inseparable such that a figure in which the waveguide 36 is projected in a positive direction on the z axis is positioned near a center of both end portions in the x axis direction of the eighth-side converting unit 60 and the antenna connecting portion 62.

As described in a section [Regarding the waveguide] below, even in a case in which a direction in which the waveguide extends that is an axial direction of the waveguide is shifted from the z direction, a figure in which the waveguide 36 is projected onto the plane that is orthogonal to the z direction and includes the eighth conductor layer L8 by a light beam that is parallel to the axial direction is preferably encompassed in the eighth-side converting unit 60.

The side protruding portion 63*a* being provided is not a requisite.

The intermediate protruding portion 63*b* being provided is not a requisite.

[Regarding the Guard Conductor]

According to the above-described embodiment, all of the plurality of side vias 48*a* are arranged such that a figure in which all of the plurality of side vias 48*a* are perpendicularly projected onto the plane that is orthogonal to the z direction and includes the eighth conductor layer L8 is encompassed in the antenna connecting portion 62 and the side protruding portions 63*a*. However, this is not limited thereto. For example, the side vias 48*a* may be arranged such that a portion of a figure in which a single side via 48*a* is perpendicularly projected onto the same plane runs outside an end portion in the y direction of the eighth-side converting unit, the antenna connecting portion 62, or the side protruding portion 63*a*.

According to the above-described embodiment, the plurality of side vias 48*a* are arranged such that one row each is arranged on both end portions in the y direction of the eighth-side converting unit and the antenna connecting portion 62. However, this is not limited thereto. For example, a plurality of rows each, such as two rows each, may be arranged. In this case, for example, positions of the side vias 48*a* in the x direction may differ between a first row and a second row. In addition, a plurality of rows may be provided in a portion that is projected onto the side protruding portions 63*a*, of the figure in which the side vias 48*a* are perpendicularly projected onto the plane that is orthogonal to the z direction and includes the eighth conductor layer L8.

In such cases, for example, regarding the side vias 48*a* in the first row, the figure in which the side vias 48*a* are perpendicularly projected onto the plane that is orthogonal to the z direction and includes the eighth conductor layer L8 may not have a portion that overlaps any of the eighth-side converting unit 60, the antenna connecting portion 62, and the side protruding portions 63*a*. However, in this case, regarding the side vias 48*a* in the second row, the figure in which the side vias 48*a* are perpendicularly projected onto the same plane is preferably encompassed in the eighth-side converting unit 60, the antenna connecting portion 62, and the side protruding portions 63*a*.

The figure in which the side vias 48*a* are perpendicularly projected onto the plane that is orthogonal to the z direction and includes the eighth conductor layer L8 having a portion that overlaps the eighth-side converting unit 60, the antenna connecting portion 62, and the side protruding portions 63*a* is not a requisite. For example, the figure in which the side vias 48*a* are perpendicularly projected onto the same plane may be arranged adjacent to the antenna connecting portion 62 or the like.

According to the present embodiment, all of the plurality of backside vias 48*b* are arranged such that a figure in which all of the plurality of backside vias 48*b* are perpendicularly projected onto the plane that is orthogonal to the z direction and includes the eighth conductor layer L8 is encompassed in the eighth-side converting unit. However, this is not limited thereto. For example, the backside vias 48*b* may be arranged such that a portion of a figure in which a single backside via 48*b* is perpendicularly projected onto the same plane extends outside an end portion in the x direction of the eighth-side converting unit.

According to the present embodiment, the plurality of backside vias 48*b* are arranged in one row in the end portion in the x direction of the eighth-side converting unit 60. However, this is not limited thereto. For example, a plurality of rows, such as two rows, may be arranged. In this case, for example, positions of the backside vias 48*b* in the y direction may differ between a first row and a second row.

In such cases as well, for example, regarding the backside vias 48*b* in the first row, the figure in which the backside vias 48*b* are perpendicularly projected onto the plane that is orthogonal to the z direction and includes the eighth conductor layer L8 may not have a portion that overlaps the eighth-side converting unit 60. However, in this case, regarding the backside vias 48*b* in the second row, the figure in which the backside vias 48*b* are perpendicularly projected onto the same plane is preferably encompassed in the eighth-side converting unit 60.

The figure in which the backside vias 48*b* are perpendicularly projected onto the plane that is orthogonal to the z direction and includes the eighth conductor layer L8 having a portion that overlaps the eighth-side converting unit is not a requisite. For example, the figure in which the backside vias 48*b* are perpendicularly projected onto the same plane may be arranged adjacent to the eighth-side converting unit 60.

According to the present embodiment, all of the plurality of intermediate vias 48*c* are arranged such that a figure in which all of the plurality of intermediate vias 48*c* are perpendicularly projected onto the plane that is orthogonal to the z direction and includes the eighth conductor layer L8 is encompassed in antenna connecting portion 2 and the intermediate protruding portion 63*b*. However, this is not limited thereto. For example, the intermediate vias 48*c* may be arranged such that a portion of a figure in which a single intermediate via 48*c* is perpendicularly projected onto the plane that is orthogonal to the z direction and includes the eighth conductor layer L8 runs outside an end portion in the x direction of the intermediate protruding portion 63*b*.

According to the present embodiment, the plurality of intermediate vias 48*c* are arranged in one row along a line that is parallel to the x direction. However, this is not limited thereto. For example, a plurality of rows, such as two rows, may be arranged. In this case, for example, positions of the intermediate vias 48*c* in the y direction may differ between a first row and a second row.

The side vias 48*a*, the backside vias 48*b*, and the intermediate vias 48*c* may not be provided as the guard conductor. For example, the side vias 48*a* and the backside vias 48*b* may be provided, but the intermediate vias 48*c* may not be provided. In this case, a slit may be preferably formed in the section of the antenna connecting portion 62 in which the intermediate vias 48*c* may not be provided. In addition, for example, the intermediate vias 48*c* may be provided, but the side vias 48*a* may not be provided.

The guard conductor is not limited to that configured by a plurality of vias. For example, a portion of the plurality of side vias 48*a* and the plurality of backside vias 48*b* that configure the guard conductor may be configured by a single U-shaped conductor.

The guard conductor may not be connected to the eighth-side converting unit 60, the antenna connecting portion 62, the side protruding portions 63*a*, and the intermediate protruding portion 63*b*. For example, a dielectric layer may be provided to be interposed between: the guard conductor; and the eighth-side converting unit 60, the antenna connecting portion 62, the side protruding portions 63*a*, and the intermediate protruding portion 63*b*.

The guard conductor may not be connected to the seventh conductor layer L7. For example, a dielectric layer may be provided to be interposed between the guard conductor and the seventh conductor layer.

[Regarding the Antenna Apparatus]

For example, the fifth conductor layer may be eliminated from the inner layer portion 32, and the inner layer portion 32 may be configured by three conductor layers and two dielectric layers. In addition, for example, the fourth conductor layer L4 and the fifth conductor layer L5 may be eliminated from the inner layer portion 32, and the inner layer portion 32 may be configured by two conductor layers and one dielectric layer. Furthermore, for example, the third conductor layer L3, the fourth conductor layer L4, the fifth conductor layer L5, and the sixth conductor layer L6 may be eliminated from the inner layer portion, and the waveguide 36 may be embedded in the dielectric layer.

The second conductor layer L2 may be eliminated from the first outer layer portion 30, and the first outer layer portion 30 may be configured by one conductor layer and one dielectric layer.

The seventh conductor layer L7 may be eliminated from the second outer layer portion 34, and the second outer layer portion 34 may be configured by one conductor layer and one dielectric layer.

An interior of the waveguide 36 may not be filled with a dielectric.

The microstrip line 52 that connects the first-side converting unit 50 and the MMIC 54 may not be formed on the first conductor layer L1. For example, the MMIC 54 may be directly connected to the first-side converting unit 50.

A transmission path over which a signal is transmitted along the z direction is not limited to that uses the waveguide 36.

The MMIC 54 is not limited to that is connected to only the first conductor layer L1. For example, the MMIC 54 for transmission may be connected to the first conductor layer L1, while the MIMIC 54 for reception may be connected to the eighth conductor layer L8. In other words, the MMIC 54 for reception is connected to the antenna connecting portion 62, and thus the signals received by the first antenna 66a and the second antenna 66b may be transmitted to the MMIC 54 without passing through the waveguide 36.

The MMIC 54 may not be connected to the first conductor layer L1. That is, the MMIC 54 that performs the transmission process and the reception process may be directly connected to the antenna connecting portion 62. In this case, the first outer layer portion 30 and the inner layer portion 32 may not be provided.

[Regarding the Waveguide]

According to the above-described embodiment, an example of a waveguide in which a high frequency signal to be transmitted is in only the base mode of the TE modes is given. However, this is not limited thereto.

A cross-sectional shape of the waveguide is not limited to that given as an example according to the above-described embodiments. For example, the cross-sectional shape may be a shape in which, on both end portions in a long direction, a length in a short direction is longer than that in a center portion.

According to the above-described embodiment, the waveguide for transmission and the waveguide for reception are separate. However, this is not limited thereto.

The direction in which the waveguide extends that is the axial direction of the waveguide may not be parallel to the z direction that is the lamination direction. Misalignment may be present in the pairs of directions.

[Regarding the Processing Circuit]

According to the above-described embodiment, the MIMIC 54 has a plurality of channels. However, this is not limited thereto. For example, a MIMIC may be provided for each of the plurality of channels.

According to the above-described embodiment, the MIMIC 54, and the microcomputer 56 that performs control of the transmission and reception processes by the MMIC 54 and an analyzing process for the signals outputted by the MIMIC 54 are separate members. However, the MMIC 54 and the microcomputer 56 may be integrated.

[Regarding the Radar Apparatus]

A number of antennas for transmission and a number of antennas for reception are not limited to those given as examples according to the above-described embodiment.

For example, in a case in which a phased array process is not performed or the like, only a single antenna for transmission may be provided.

The MMIC 54 and the microcomputer 56 are not limited to that are mounted in a single antenna apparatus 18. For example, a substrate on which the MMIC 54 is mounted and a substrate on which the microcomputer 56 is mounted may be separate substrates.

The radar apparatus is not limited to that in which the output signal includes detection result signals regarding the relative speed and distance to an object outside a vehicle. For example, a signal that is used to calculate, outside the radar apparatus, the relative speed and distance to the object outside the vehicle may be the output signal.

The radar apparatus for a vehicle is not limited to the apparatus that transmits and receives radar of 76 to 77 GHz. For example, the radar apparatus may be an apparatus that transmits and receives radar of 76 to 80 GHz. For example, the radar apparatus may be an apparatus that transmits and receives radar in the 24 GHz band. Moreover, the radar apparatus is not limited to an apparatus that transmits and receives millimeter-wave radar.

[Other]

A material of the dielectric layer is not limited to that given as an example according to the above-described embodiment.

A material of the conductor layer is not limited to that given as an example according to the above-described embodiment.

What is claimed is:

1. An antenna apparatus comprising:
   a conductor layer A;
   a conductor layer B; and
   a dielectric layer that is sandwiched between the conductor layer A and the conductor layer B, wherein:
   a first antenna, a second antenna, and a connection conductor are formed in the conductor layer A, the connection conductor being connected to both of the first antenna and the second antenna,
   a guard conductor is provided in the dielectric layer,
   the guard conductor is arranged along an outer periphery of the connection conductor that excludes at least a first connection section and a second connection section of the connection conductor, the first connection section being a connection section of the connection conductor that is connected to the first antenna, and the second connection section being a connection section of the connection conductor that is connected to the second antenna,
   the connection conductor includes side protruding portions that protrude in an extension direction, in which the first antenna and the second antenna are extended, so as to sandwich two connection sections that are the first connection section and the second connection section, and
   the guard conductor is also arranged in a position along the side protruding portions.

2. The antenna apparatus according to claim 1, wherein:
   the guard conductor is also arranged in a position that is parallel to an extension direction in which the first antenna and the second antenna are extended and is sandwiched between the first connection section and the second connection section.

3. The antenna apparatus according to claim 1, wherein:
   a waveguide is provided so as to be separated from the connection conductor in a direction from the conductor layer A towards the conductor layer B; and a figure of the waveguide projected onto a plane, which is orthogonal to a lamination direction in which the conductor layer B, the dielectric layer, and the conductor layer A are laminated and includes the conductor layer A, by a light beam parallel to an axial direction of the waveguide, is surrounded by a figure of the guard conductor perpendicularly projected onto the plane and included in the connection conductor, excluding at least a portion near the first connection section and a portion near the second connection section.

4. The antenna apparatus according to claim 1, wherein:
the first connection section includes a portion of which a length in a direction that is orthogonal to an extension direction of the first antenna becomes shorter towards a direction, of the extension direction, in which the first antenna extends.

5. The antenna apparatus according to claim 1, wherein:
the connection conductor includes an intermediate protruding portion that protrudes in an extension direction of the first antenna and the second antenna so as to be sandwiched between two connection sections that are the first connection section and the second connection section; and
the guard conductor is also arranged in a position along the intermediate protruding portion.

6. The antenna apparatus according to claim 1, wherein:
the guard conductor is configured by a plurality of vias.

7. An antenna apparatus comprising:
a conductor layer A;
a conductor layer B; and
a dielectric layer that is sandwiched between the conductor layer A and the conductor layer B, wherein:
a first antenna, a second antenna, and a connection conductor are formed in the conductor layer A, the connection conductor being connected to both of the first antenna and the second antenna,
a guard conductor is provided in the dielectric layer,
the guard conductor is arranged along an outer periphery of the connection conductor that excludes at least a first connection section and a second connection section of the connection conductor, the first connection section being a connection section of the connection conductor that is connected to the first antenna, and the second connection section being a connection section of the connection conductor that is connected to the second antenna,
the connection conductor includes an intermediate protruding portion that protrudes in an extension direction of the first antenna and the second antenna so as to be sandwiched between two connection sections that are the first connection section and the second connection section, and
the guard conductor is also arranged in a position along the intermediate protruding portion.

8. The antenna apparatus according to claim 7, wherein:
the guard conductor is also arranged in a position that is parallel to an extension direction in which the first antenna and the second antenna are extended and is sandwiched between the first connection section and the second connection section.

9. The antenna apparatus according to claim 7, wherein:
a waveguide is provided so as to be separated from the connection conductor in a direction from the conductor layer A towards the conductor layer B; and
a figure of the waveguide projected onto a plane, which is orthogonal to a lamination direction in which the conductor layer B, the dielectric layer, and the conductor layer A are laminated and includes the conductor layer A, by a light beam parallel to an axial direction of the waveguide, is surrounded by a figure of the guard conductor perpendicularly projected onto the plane and included in the connection conductor, excluding at least a portion near the first connection section and a portion near the second connection section.

10. The antenna apparatus according to claim 7, wherein:
the first connection section includes a portion of which a length in a direction that is orthogonal to an extension direction of the first antenna becomes shorter towards a direction, of the extension direction, in which the first antenna extends.

11. The antenna apparatus according to claim 7, wherein:
the connection conductor includes side protruding portions that protrude in an extension direction, in which the first antenna and the second antenna are extended, so as to sandwich two connection sections that are the first connection section and the second connection section; and
the guard conductor is also arranged in a position along the side protruding portions.

12. The antenna apparatus according to claim 7, wherein:
the guard conductor is configured by a plurality of vias.

13. A radar apparatus comprising:
an antenna apparatus comprising:
a conductor layer A;
a conductor layer B; and
a dielectric layer that is sandwiched between the conductor layer A and the conductor layer B, wherein
a first antenna, a second antenna, and a connection conductor are formed in the conductor layer A, the connection conductor being connected to both of the first antenna and the second antenna,
a guard conductor is provided in the dielectric layer, and
the guard conductor is arranged along an outer periphery of the connection conductor that excludes at least a first connection section and a second connection section of the connection conductor, the first connection section being a connection section of the connection conductor that is connected to the first antenna, and the second connection section being a connection section of the connection conductor that is connected to the second antenna, and
the guard conductor is also arranged in a position that is parallel to an extension direction in which the first antenna and the second antenna are extended and is sandwiched between the first connection section and the second connection section; and
a processing circuit that performs at least one process of two processes that are a transmission process and a reception process for high frequency signals using the first antenna and the second antenna, wherein
the connection conductor includes side protruding portions that protrude in an extension direction, in which the first antenna and the second antenna are extended, so as to sandwich two connection sections that are the first connection section and the second connection section, and
the guard conductor is also arranged in a position along the side protruding portions.

14. The radar apparatus according to claim 13, wherein:
the antenna apparatus includes a conductor layer C that is separated from the conductor layer B in a direction from the conductor layer A towards the conductor layer B; and the processing circuit is connected to the conductor layer C.

15. A radar apparatus comprising:

an antenna apparatus comprising:

a conductor layer A;

a conductor layer B; and a dielectric layer that is sandwiched between the conductor layer A and the conductor layer B, wherein a first antenna, a second antenna, and a connection conductor are formed in the conductor layer A, the connection conductor being connected to both of the first antenna and the second antenna, a guard conductor is provided in the dielectric layer, and the guard conductor is arranged along an outer periphery of the connection conductor that excludes at least a first connection section and a second connection section of the connection conductor, the first connection section being a connection section of the connection conductor that is connected to the first antenna, and the second connection section being a connection section of the connection conductor that is connected to the second antenna, and the guard conductor is also arranged in a position that is parallel to an extension direction in which the first antenna and the second antenna are extended and is sandwiched between the first connection section and the second connection section; and a processing circuit that performs at least one process of two processes that are a transmission process and a reception process for high frequency signals using the first antenna and the second antenna, wherein the connection conductor includes an intermediate protruding portion that protrudes in an extension direction of the first antenna and the second antenna so as to be sandwiched between two connection sections that are the first connection section and the second connection section, and the guard conductor is also arranged in a position along the intermediate protruding portion.

16. The radar apparatus according to claim 15, wherein:

the antenna apparatus includes a conductor layer C that is separated from the conductor layer B in a direction from the conductor layer A towards the conductor layer B; and the processing circuit is connected to the conductor layer C.

* * * * *